(12) United States Patent
Vogel (10) Patent No.: US 10,028,039 B2
(45) Date of Patent: Jul. 17, 2018

(54) EXTERNAL PASS-THROUGH FILTERS FOR OPTICAL MICRONODES AND RELATED ASSEMBLIES AND METHODS

(71) Applicant: ADTRAN, Inc., Huntsville, AL (US)

(72) Inventor: Mark O. Vogel, Statesville, NC (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 14/940,217

(22) Filed: Nov. 13, 2015

(65) Prior Publication Data

US 2016/0337728 A1 Nov. 17, 2016

Related U.S. Application Data

(60) Provisional application No. 62/161,008, filed on May 13, 2015.

(51) Int. Cl.
| | |
|---|---|
| *H04Q 11/00* | (2006.01) |
| *G02B 6/44* | (2006.01) |
| *H04J 14/02* | (2006.01) |
| *H04B 10/2575* | (2013.01) |
| *G02B 6/293* | (2006.01) |
| *G02B 6/42* | (2006.01) |

(52) U.S. Cl.
CPC ..... *H04Q 11/0005* (2013.01); *G02B 6/29362* (2013.01); *G02B 6/4448* (2013.01); *H04B 10/25751* (2013.01); *H04J 14/0212* (2013.01); *G02B 6/29382* (2013.01); *G02B 6/4285* (2013.01); *H04Q 2011/0009* (2013.01); *H04Q 2011/0016* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0118459 | A1* | 8/2002 | Kuznetsov | G02B 6/29358 359/578 |
| 2003/0007148 | A1* | 1/2003 | Moon | G01J 3/02 356/328 |
| 2011/0099601 | A1* | 4/2011 | Riggsby | H04N 7/22 725/127 |
| 2013/0129344 | A1* | 5/2013 | Storey | H04B 10/0773 398/20 |

* cited by examiner

*Primary Examiner* — David Payne
*Assistant Examiner* — Omar S Ismail
(74) *Attorney, Agent, or Firm* — Fish & Richardson P.C.

(57) ABSTRACT

Assemblies include a micronode having an optical connector, a coaxial connector port and a housing that includes a plurality of mounting bores. The assembly further includes a filter having a housing that underlies the micronode housing, the filter housing including a plurality of mounting bores, the mounting bores of the filter housing aligning with the mounting bores of the micronode housing. The filter further includes a first optical connector configured to receive an optical drop cable, a second optical connector configured to receive an optical cable and an optical pigtail cord that is connected to the optical connector of the micronode.

18 Claims, 6 Drawing Sheets

EXTERNAL PASS-THROUGH FILTERS FOR OPTICAL MICRONODES AND RELATED ASSEMBLIES AND METHODS

CROSS-REFERENCE TO RELATED APPLICATION

The present application claims priority under 35 U.S.C. § 119 to U.S. Provisional Patent Application Ser. No. 62/161,008, filed May 13, 2015, the entire content of which is incorporated herein by reference as if set forth in its entirety.

FIELD OF THE INVENTION

The present invention relates generally to fiber optic networks and, more particularly, to methods and equipment for deploying additional services to subscriber premises over such networks.

BACKGROUND

A cable television network is a well-known type of communications network that is used to transmit cable television signals and/or other information between one or more service providers and a plurality of subscribers. Most conventional cable television networks comprise hybrid fiber-coaxial ("HFC") networks that transmit these signals over a combination of fiber optic cables and coaxial cables. In such networks, fiber optic cables are typically used to carry signals from the headend facilities of the service provider to various distribution points, while less expensive coaxial cable may be used, for example, to carry the signals into neighborhoods and/or into individual subscriber premises. In many cases, the proportion of an HFC network that comprises fiber optic cables is increasing. For example, many HFC networks are now implemented as Fiber-to-the Curb ("FTTC") or as Fiber-to-the-Home ("FTTH") networks, where the fiber portion of the network may extend down residential streets in the network (in FTTC applications) or all the way to individual subscriber premises (in FTTH) applications.

Typically, the service provider is a cable television company that may have exclusive rights to offer cable television services in a particular geographic area. The subscribers in a cable television network typically pay the service provider to deliver various services to the "subscriber premises" which may include, for example, individual homes, apartments, hotels, businesses, etc. The services offered by the cable television service provider may include, for example, broadcast cable television service, broadband Internet connectivity, and/or Voice-over-Internet Protocol ("VoIP") digital telephone service. Some customers also receive additional very high data rate services such as video surveillance, very high data rate Internet connectivity and the like. Delivering these services involves transmitting data between the service provider and the subscriber premises. This data is typically delivered to the subscriber premises as radio frequency ("RF") signals.

RF over Glass ("RFoG") networks are a particular type of FTTH network. In an RFoG network, fiber optic cables are used to carry analog RF signals that are modulated onto laser beams for transport as optical signals over the fiber optic network infrastructure. These optical signals are then converted back to RF signals at the head-end facilities and at each subscriber premise. One advantage of such systems is that the network infrastructure is transparent to the RF signals, and this allows cable television network operators to continue to deploy the same customer premise equipment that is used in conventional analog HFC networks at each subscriber premise. This customer premise equipment includes set-top boxes, DOCSIS cable modems, and DOCSIS VoIP modems, all of which are in wide use today. The downstream optical signals in an RFoG network (i.e., the signals transmitted from the head-end facilities to the subscriber premises) are transmitted at a nominal wavelength of 1550 nm, and the upstream signals (i.e., the signals transmitted from the subscriber premises to the head-end facilities) are transmitted at a nominal wavelength of 1610 nm.

A Passive Optical Network ("PON") refers to another type of FTTH network. In a PON network, fiber optic cables are used to carry digital RF signals that are modulated onto laser beams for transport over the fiber optic network infrastructure. As with RFoG networks, in PON networks the network infrastructure is transparent to the RF signals. Conventional PON networks are referred to as 1 GHz PON networks and in such networks the downstream optical signals are transmitted at a nominal wavelength of 1490 nm, and the upstream optical signals are transmitted at a nominal wavelength of 1310 nm. A newer generation of PON networks (referred to as 10 GHz PON networks) is also being introduced. In 10 G PON networks, the downstream optical signals are transmitted at a nominal wavelength of 1577 nm, and the upstream optical signals are transmitted at a nominal wavelength of 1270 nm.

In RF-based FTTH systems such as RFoG and PON networks, optical network units are installed at the subscriber premises and used to convert optical signals that are received from the head-end facilities into RF signals that may be processed by the customer premise equipment, and are also used to convert RF signals that are received from the customer premise equipment into optical signals that are launched onto the fiber optic network for delivery to the head-end facilities. In RFoG networks, these optical network units are commonly referred to as "micronodes" or as RFoG optical network units or "RONUs." In PON networks, the optical network units that are placed at customer premises are also often referred to as micronodes, although other names may be used. Herein, both RFoG optical network units and PON optical network units will be generically referred to as "micronodes."

As the optical signals in the above-discussed RFoG, 1 G PON and 10 G PON networks are transmitted in non-overlapping wavelength ranges, the same underlying optical fiber optic network infrastructure may be used to transmit all three types of signals. Consequently, one technique for increasing the bandwidth provided to a subscriber in, for example, an RFoG network is to also transmit data between the subscribe premise and the head-end facilities at one or both of the 1 G PON and/or the 10 G PON wavelengths.

SUMMARY

Pursuant to embodiments of the present invention, assemblies are provided that include a micronode having a micronode housing and a filter having a filter housing. The micronode has an optical connector and a coaxial connector port, and the micronode housing includes a plurality of mounting bores. The filter housing underlyies the micronode housing, and includes a plurality of mounting bores, the mounting bores of the filter housing aligning with the mounting bores of the micronode housing. The filter includes a first optical connector that is configured to receive an optical drop cable, a second optical connector that is configured to receive an optical cable, and an optical pigtail cord that is configured to connect to the optical connector of the micronode.

In some embodiments, the filter may further include circuits that route optical signals in the ranges of about 1550 nm and about 1610 nm to the optical pigtail cord and that route optical signals in other wavelength ranges to the second optical connector.

In some embodiments, the filter may include a first low pass wave division multiplexer, a second low pass wave division multiplexer and a notch wave division multiplexer. In such embodiments, the notch wave division multiplexer may pass signals in the 1540-1565 nm and 1600-1620 nm wavelength ranges between the first low pass wave division multiplexer and the optical pigtail cord, and may pass signals in the 1575-1580 nm wavelength range between the first low pass wave division multiplexer and the second low pass wave division multiplexer. Additionally, the first low pass wave division multiplexer may pass signals at wavelengths below about 1500 nm between the optical drop cable and the second low pass wave division multiplexer, and may pass signals at wavelengths above about 1540 nm between the optical drop cable and the notch wave division multiplexer.

In other embodiments, the filter may include a low pass wave division multiplexer, a first notch wave division multiplexer and a second notch wave division multiplexer. In such embodiments, the first notch wave division multiplexer may pass signals in about the 1600-1620 nm wavelength range between the optical drop cable and the low pass wave division multiplexer, and may pass optical signals in wavelength ranges below about 1580 nm and above about 1625 nm between the optical drop cable and the second notch wave division multiplexer. Additionally, the second notch wave division multiplexer may pass signals in about the 1540-1565 nm wavelength range between the first notch wave division multiplexer and the low pass wave division multiplexer, and may pass optical signals below about 1495 nm and above about 1600 nm between the first notch wave division multiplexer and the second optical connector. The low pass wave division multiplexer may pass signals in the RFoG upstream and downstream wavelength bands between the first and/or second notch wave division multiplexers and the optical pigtail cord.

In some embodiments, the filter housing may have substantially the same footprint as the micronode housing.

Pursuant to further embodiments of the present invention, assemblies are provided that include a a micronode having an optical connector port and at least one radio frequency connector port and a filter that is configured to be mounted on the micronode, the filter having a first optical connector port that is configured to be connected to a drop cable of a cable television network, a second optical connector port that is configured to be connected to the micronode, and a third optical connector port that is configured to be connected to an external device.

In some embodiments, the filter may be configured to be detachably mounted on the micronode via at least one snap clip.

In some embodiments, the filter may have substantially the same footprint as the micronode.

In some embodiments, the micronode may have a housing that includes a first plurality of mounting bores and the filter may have a housing that has a second plurality of mounting bores that align with the first plurality of mounting bores when the filter is positioned on the micronode.

In some embodiments, the filter may include a first low pass wave division multiplexer, a second low pass wave division multiplexer and a notch wave division multiplexer. In such embodiments, In some embodiments, the notch wave division multiplexer may pass signals in the 1540-1565 nm and 1600-1620 nm wavelength ranges between the first low pass wave division multiplexer and the micronode, and may pass signals in the 1575-1580 nm wavelength range between the first low pass wave division multiplexer and the second low pass wave division multiplexer. The first low pass wave division multiplexer may pass signals at wavelengths below about 1500 nm between the drop cable and the second low pass wave division multiplexer, and may pass signals at wavelengths above about 1540 nm between the drop cable and the notch wave division multiplexer.

In other embodiments, the filter may include a low pass wave division multiplexer, a first notch wave division multiplexer and a second notch wave division multiplexer. In such embodiments, the first notch wave division multiplexer may pass signals in about the 1600-1620 nm wavelength range between the drop cable and the low pass wave division multiplexer, and may pass optical signals in wavelength ranges below about 1580 nm and above about 1625 nm between the drop cable and the second notch wave division multiplexer. The second notch wave division multiplexer may pass signals in about the 1540-1565 nm wavelength range between the first notch wave division multiplexer and the low pass wave division multiplexer, and may pass optical signals below about 1495 nm and above about 1600 nm between the first notch wave division multiplexer and the external device.

Pursuant to still further embodiments of the present invention, methods of deploying an additional service to a subscriber premise of a fiber-to-the-home network are provided. Pursuant to these methods, an external pass-through filter is mounted to a first micronode that was pre-installed at the subscriber premise. A fiber optic drop cable is disconnected from a connector port on the first micronode and connecting the fiber optic drop cable to a common port on the external pass-through filter. A pigtail of the external pass-through filter is connected to the connector port of the first micronode. A second micronode is installed at the subscriber premise. A connector port of the second micronode is connected to a pass-through connector port of the external pass-through filter using a fiber optic patch cord. A customer premise device is connected to a coaxial connector port of the second micronode.

DETAILED DESCRIPTION

Pursuant to embodiments of the present invention, assemblies are provided that include a micronode and an external pass-through filter that may be mounted to the micronode. The micronode may be usable in a stand-alone configuration to receive downstream optical signals from the cable television network and to convert these optical signals into RF signals that are transmitted to customer premise equipment within a subscriber premise, and to convert upstream RF signals received from the customer premise equipment into optical signals that are transmitted to the head-end facilities over the cable television network. The pass-through filter may be used to filter downstream optical signals received from the head-end facilities and pass them either to the micronode or to a second micronode in order to provide increased communications bandwidth to a subscriber premise. The pass-through filter likewise combines optical signals received from the micronode and the second micronode and transmits the combined optical signal onto the cable television network. The pass-through filter may be configured to be mounted to the micronode to provide a composite assembly.

In some embodiments, the micronode may comprise an RFoG micronode, and the second micronode may comprise a PON micronode. The RFoG micronode may already be installed at a subscriber premise. If the subscriber orders additional services that have bandwidth requirements that exceed the bandwidth of the RFoG micronode, a pass-through filter according to embodiments of the present invention may be used to provide increased bandwidth to the subscriber premise without replacing the RFoG micronode. In particular, instead of replacing the RFoG micronode that is already deployed at the subscriber premise with a higher bandwidth micronode, one of the pass-through filters according to embodiments of the present invention may by mounted to the existing RFoG micronode, and a PON micronode or other optical device may be deployed at the subscriber premise and connected to the pass-through filter. The newly ordered services may be provided to the subscriber premise through the newly installed second (PON) micronode. The existing services may continue to be provided to the subscriber premise through the RFoG micronode and the customer premise equipment devices that are already installed at the subscriber premise. The pass-through filter assembly may be used to direct downstream optical signals to the appropriate micronode, and to combine upstream optical signals received from the two micronodes and pass the combined upstream signal onto the cable television network. This approach for upgrading the bandwidth capabilities at a subscriber premise may be simpler for an installer, may avoid the need to switch out customer premise equipment devices, and/or may allow the use of lower cost components.

Embodiments of the present invention will now be discussed in further detail with reference to the drawings.

Figure 1:
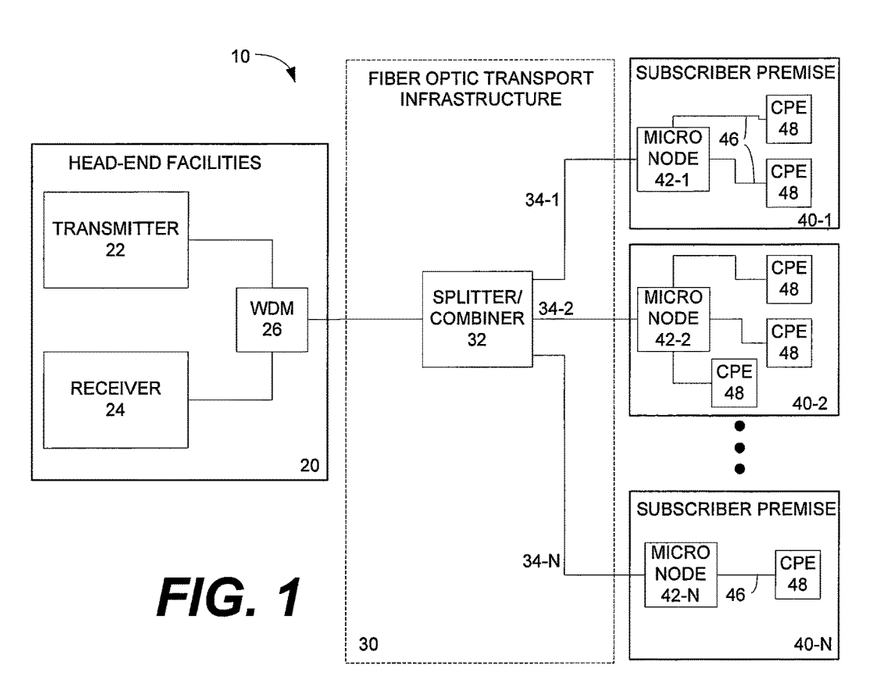
FIG. 1 is a schematic diagram of a portion of a cable television network.

FIG. 1 is a schematic block diagram illustrating a portion of a cable television network 10 that is suitable for use as an RFoG network. As shown in FIG. 1, the cable television network 10 includes head-end facilities 20, a fiber optic transport network 30 and a plurality of subscriber premises 40-1 through 40-N (referred to collectively herein as subscriber premises 40). The head-end facilities 20 may include, among other things, a transmitter 22, a receiver 24 and a wave division multiplexer 26. The transmitter 22 is used to transmit downstream optical signals onto the fiber optic transport network 30 for delivery to the individual subscriber premises 40. The receiver 24 may receive upstream optical signals transmitted from individual subscriber premises 40, convert these signals to RF signals, and then demodulate the RF signals. The wave division multiplexer 26 may act as a switch that routes the downstream signals from the transmitter 22 to the fiber optic transport network 30 and that routes the upstream signals from the fiber optic transport network 30 to the receiver 24. The upstream and downstream signals are at different wavelengths which allows the wave division multiplexer 26 to correctly route the upstream and downstream signals in this manner. Transmitters 22, receivers 24 and wave division multiplexers 26 are well known in the art and hence further description thereof will be omitted.

The fiber optic transport network 30 may comprise a network of fiber optic cables and supporting equipment such as splitters, combiners, amplifiers and the like that provide optical communications paths between the head-end facilities 20 and the subscriber premises 40. The architecture of such fiber optic transport networks 30 and the devices and cabling used to implement them are well known in the art and hence the fiber optic transport network 30 is, for the most part, depicted generically in FIG. 1 using a rectangular box. As shown in FIG. 1, the last leg of the fiber optic transport network 30 may comprise a 1×N optical splitter/tap 32 that splits the downstream optical signal N-ways and outputs the split signal onto N fiber optic drop cables 34-1 through 34-N for delivery to the individual subscriber premises 40. The optical splitter/tap unit 32 is connected to the head-end facilities 20 by a network of optical fibers and intervening equipment (not shown). Typically, "N" is equal to thirty-two under the RFoG standard ANSI/SCTE 174 2010. The optical splitter/combiner 32 likewise combines the upstream optical signals received over the fiber optic drop cables 34 into a composite upstream signal and then outputs that composite upstream signal onto other fiber optic segments of the fiber optic transport network 30.

RFoG micronodes 42-1 through 42-N are installed at the respective customer premises 40. Each RFoG micronode 42 is connected by a respective one of the fiber optic drop cables 34 to the splitter/tap unit 32. In an RFoG environment, the RFoG micronode 42 typically marks the demarcation point between the outside fiber plant that is controlled by the cable television service provider and a subscriber-owned coaxial cable distribution network 46 within the subscriber premise 40. Typical RFoG micronodes 42 may include a first port for receiving a fiber optic drop cable of the RFoG network (i.e., fiber optic cable 34 in FIG. 1) and one or more second ports for receiving electrical conductors such as coaxial cables of the coaxial cable distribution network 46 in the subscriber premise 40. The RFoG micronode 42 may include an optical-to-electrical converter for converting optical signals received on the optical fiber drop cable 34 to radio frequency ("RF") signals that can be transmitted over the coaxial cables of the coaxial cable distribution network 46. One or more customer premise equipment ("CPE") devices 48 such as set top boxes, cable modems or VoIP modems may be connected to each RFoG micronode 42 via the in-premise coaxial cable distribution network 46. The optical-to-electrical converter may comprise, for example, a photodiode that outputs electrical signals in response to received optical signals. The RFoG micronode 42 also includes an electrical-to-optical converter in the form of a laser that converts RF signals received from the customer premise equipment devices 48 in the in-premise coaxial cable distribution network 46 into optical signals and transmits these optical signals upstream over the fiber optic drop cable 34.

Figure 2:
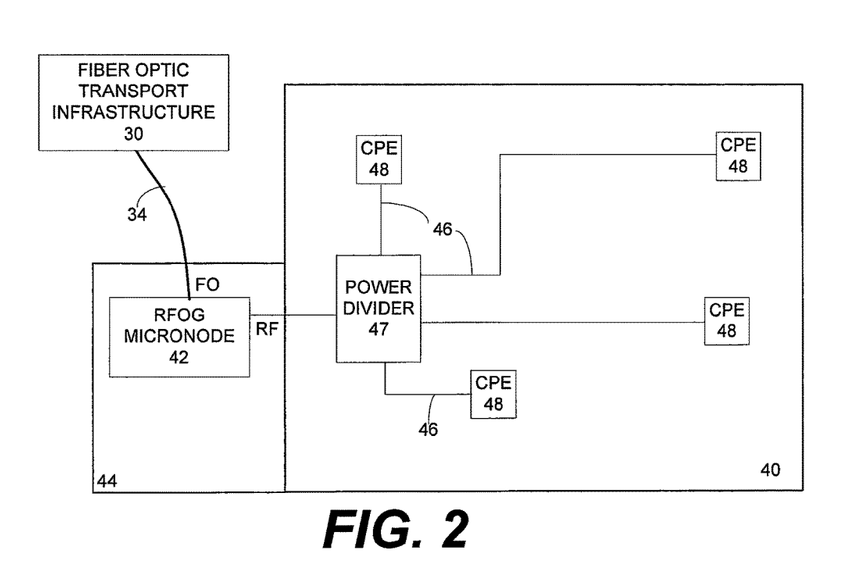
FIG. 2 is a schematic diagram of a conventional subscriber premise in the cable television network of FIG. 1.

FIG. 2 is a schematic diagram of one of the subscriber premises 40 in the cable television network 10 of FIG. 1. As shown in FIG. 2, the fiber optic drop cable 34 connects the RFoG micronode 42 to the remainder of the fiber optic transport network 30. The drop cable 34 may comprise a connectorized fiber optic cable that has one or more optical fibers therein. An RFoG micronode 42 is located within an enclosure 44 that is installed, for example, on an outside wall of the subscriber premise 40. The RFOG micronode 42 has a fiber optic adapter or other fiber optic connector that is configured to receive the connector on the end of the drop cable 34. The RFoG micronode 42 also has one or more RF ports such as female F-style connector ports. In FIG. 2 (and in FIG. 3 below), "FO" indicates a fiber optic connection and "RF" indicates a radio frequency connection.

One or more connectorized coaxial cables of the in-premise coaxial cable distribution network 46 may be connected to the RF ports of the RFoG micronode 42. The in-premise coaxial cable distribution network 46 typically includes a power divider network 47 that allows multiple customer premise equipment devices 48 in the subscriber premise 40 to transmit signals to and receive signals from the RFoG micronode 42. The customer premise equipment devices 48 may comprise RFoG compatible equipment such as set-top boxes, DOCSIS cable modems, and DOCSIS VoIP modems.

As noted above, RFoG micronodes 42 convert the optical signals into analog RF signals, that are compatible with the customer premise equipment 48 that is already deployed in the vast majority of subscriber premises 40. As such, upgrading a subscriber premise 40 in an HFC network so that it is connected to an FTTH network may be transparent to the subscriber, except that increased bandwidth is now available due to the higher bandwidth of the fiber optic connection. If a subscriber in an RFoG FTTH network orders additional high bandwidth services that exceed the bandwidth of the fiber optic connection, one solution is to replace the RFoG micronode 42 at the subscriber premise 40 with, for example, a 10 G PON micronode. This, however, requires replacing all of the customer premise equipment devices 48 at the subscriber premise 40, as 10 G PON networks transport digital RF signals that are incompatible with RFoG network customer premise equipment.

Another possibility is to replace the RFoG micronode with a composite micronode that is capable of transmitting and receiving both RFoG and PON optical signals. However, providing such a composite micronode along with the filtering required to properly route the RFoG and PON signals is a challenge, and may require a very expensive device.

Figure 3:
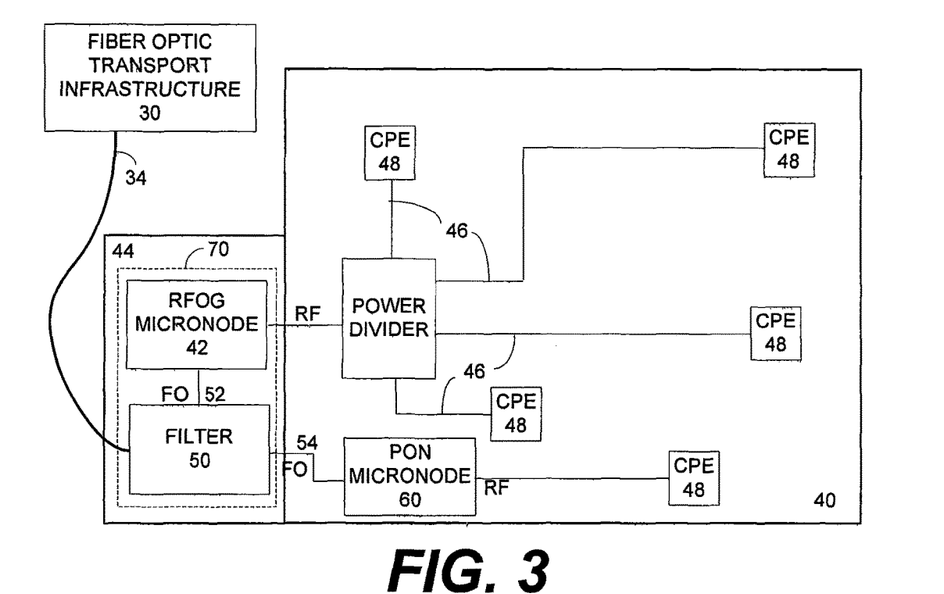
FIG. 3 is a schematic diagram of a subscriber premise in the RFoG network of FIG. 1 that has been upgraded to support both RFoG and PON communications according to embodiments of the present invention.

Pursuant to embodiments of the present invention, assemblies are provided that include a first micronode (e.g., an RFoG micronode) and an external pass-through filter that may include a pigtail that may be connected to an optical port on the first micronode and that may be mounted to the first micronode. These assemblies may be used to allow a subscriber premise 40 to communicate with the head-end facilities 20 over both the RFoG network and an additional network such as a PON network using the same underlying fiber optic network infrastructure 30. FIG. 3 is a schematic diagram of a subscriber premise 40 in the cable television network 10 of FIG. 1 that has been upgraded to receive both RFoG and PON communications from the cable television network 10 according to embodiments of the present invention.

As shown in FIG. 3, an RFoG micronode 42 is located within an enclosure 44 at the subscriber premise 40. A pass-through filter 50 is also mounted in the enclosure 44. The pass-through filter 50 and the micronode 42 may together comprise an assembly 70, and the pass-through filter 50 and the micronode 42 may be attached to each other and mounted as a single unit within the enclosure 44. A PON micronode 60 may also be installed at the subscriber premise 40. As shown in FIG. 3, the PON micronode 60 is typically located within the subscriber premise 40. The fiber optic drop cable 34 connects to the pass-through filter 50. A fiber optic cable 52 (e.g., a pigtail cable) connects the pass-through filter 50 to the RFoG micronode. A fiber optic patch cord 54 connects the PON micronode 60 to the pass-through filter 50. The RFoG micronode 42 has one or more RF connector ports that may be connected to an in-premise coaxial cable distribution network 46. The PON micronode 60 may be connected to, for example, a PON-compatible customer premise equipment device 48.

The pass-through filter 50 includes filters in the form of wave division multiplexers that separate the downstream RFoG optical signals from the downstream PON optical signals and route these downstream signals to the RFoG and PON micronodes 42, 60, as appropriate. The pass-through filter 50 may likewise receive upstream optical signals from the RFoG and PON micronodes 42, 60 and may combine these signals and pass them to the fiber optic drop cable 34. In this manner, the assembly 70 allows a subscriber premise 40 to utilize both the RFoG and PON bandwidth and thus may significantly increase the amount of bandwidth that may be provided to the subscriber premise 40.

Figure 4:
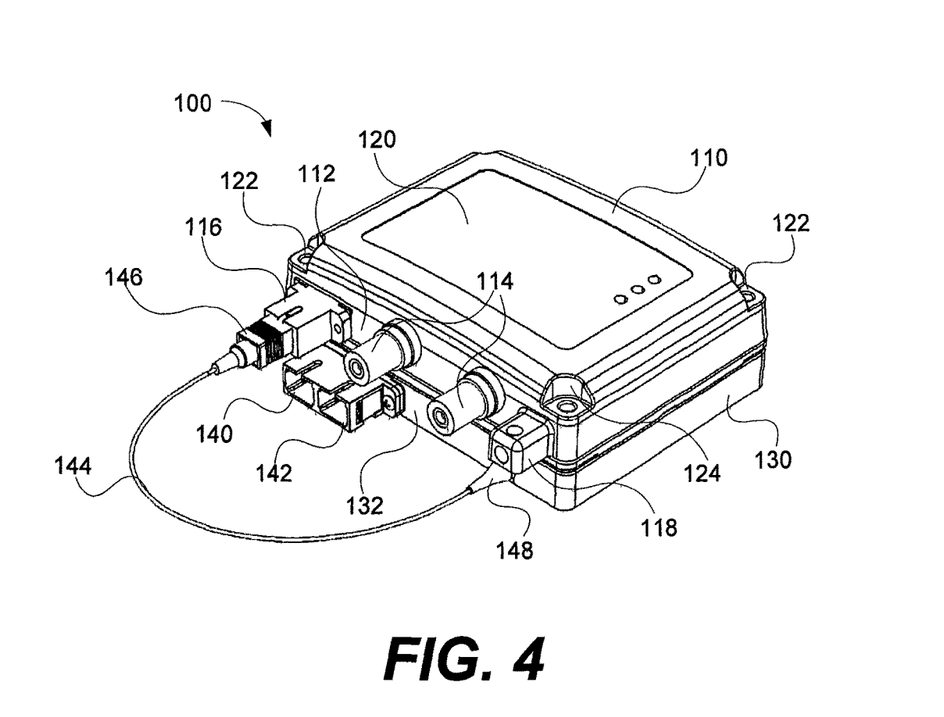
FIG. 4 is a perspective view of an assembly comprising a pass-through filter and a micronode according to embodiments of the present invention.
Figure 5:
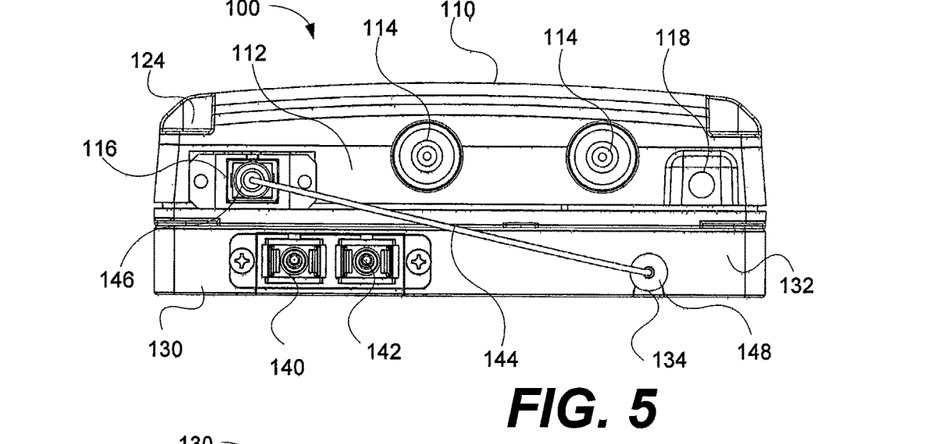
FIG. 5 is a front view of the assembly of FIG. 4.
Figures 6, 7:
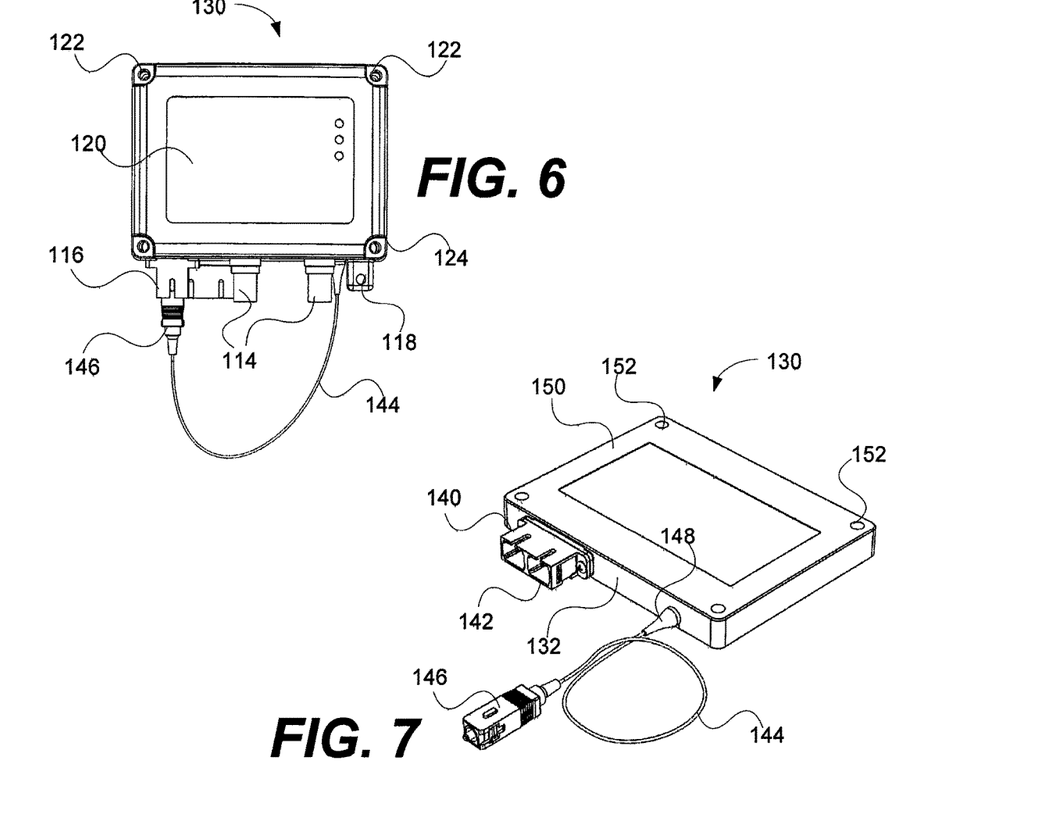
FIG. 6 is a top view of the assembly of FIG. 4.
FIG. 7 is a perspective view of the pass-through filter of the assembly of FIG. 4.
Figure 8:
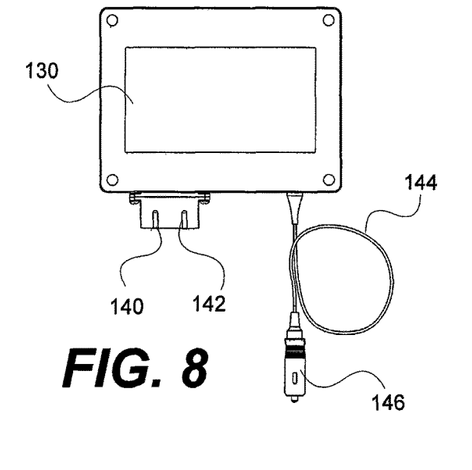
FIG. 8 is a top view of the pass-through filter of FIG. 7.
Figure 9:
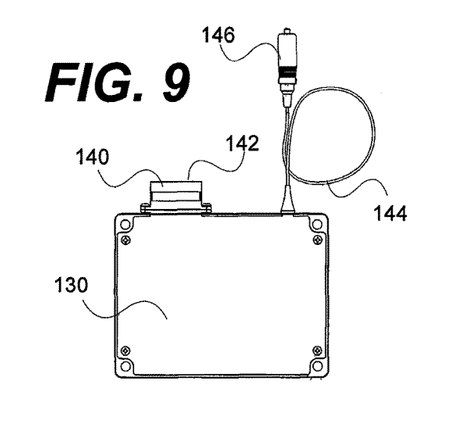
FIG. 9 is a bottom view of the pass-through filter of FIG. 7.
Figure 10:
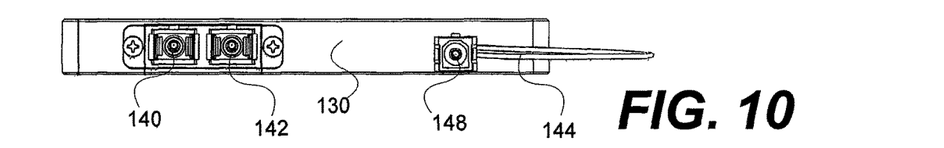
FIG. 10 is a front view of the pass-through filter of FIG. 7.
Figure 11:
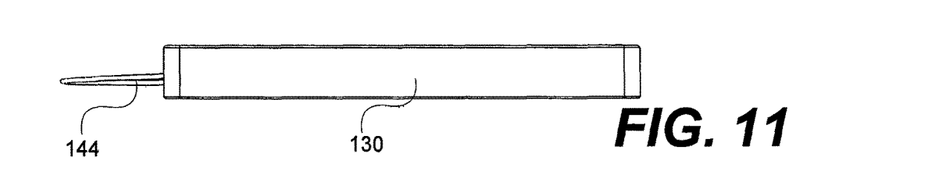
FIG. 11 is a rear view of the pass-through filter of FIG. 7.
Figure 12:
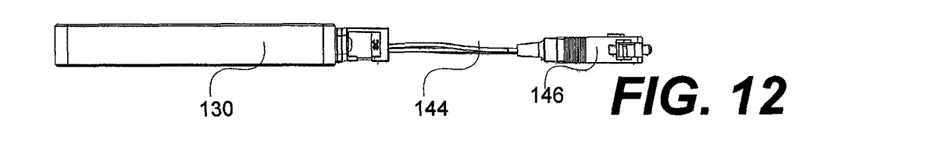
FIG. 12 is a side view of the pass-through filter of FIG. 7.
Figure 13:
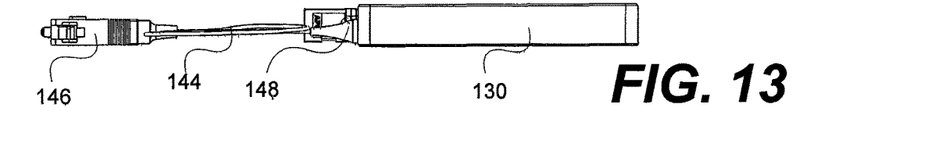
FIG. 13 is an opposite side view of the pass-through filter of FIG. 7.

A micronode pass-through filter assembly, designated broadly at 100, is illustrated in FIGS. 4-6. The assembly 100 includes a micronode 110 and a pass-through filter 130. The micronode 110 may comprise, for example an RFoG micronode that may be used as one of the RFoG micronodes 42 in the cable television network 10 of FIGS. 1 and 3. The micronode 110 may be configured to receive downstream optical signals from the cable television network 10 and may include a photodetector that is used to convert the optical signals into RF signals that are passed from the RFoG micronode 110 to RFoG compatible RF customer premises equipment 48 located at the subscriber premises 40 (see FIG. 3). The micronode 110 may also include a laser, and upstream RF signals that are received from the RFoG compatible customer premise equipment 48 may be used to directly modulate the optical output of the laser to transmit the upstream signals as an optical signal to the head-end facilities 20 over the fiber optic transport network 30.

The micronode 110 is generally rectangular and includes a front wall 112 with two radio-frequency (RF) coaxial ports 114 and an optical adapter 116. A grounding block 118 also projects from the front wall 112. The RF coaxial ports 114 are configured to be connected to a modem, cable box, or other RF customer premise equipment 48 either directly or through an in-premise coaxial cable distribution network 46. The top surface 120 of the micronode 110 has four mounting bores 122 in recesses 124 located at its corners. An exemplary micronode is the BOS-MN1602, available from CommScope, Inc., Hickory, N.C.

Referring to FIGS. 4-13, the pass-through filter 130 is also generally rectangular and of substantially the same footprint as the micronode 110. The pass-through filter 130 includes a front wall 132 and a top surface 150. Four mounting bores 152 are formed in the corners of the top surface 150 that align with the mounting bores 122 in the micronode 110.

A pair of optical connectors 140, 142 are mounted side-by-side in the front wall 132. The optical connector 140 is configured to receive a fiber optic cable of the fiber optic network such as, for example, a drop cable 54. The optical connector 142 is a "pass-through" port that is configured to receive an optical cable that is connected to an external optical device, which may comprise, for example, a second micronode such as PON micronode 60. A pigtail cord 144 is mounted in and extends from the front wall 132 of the filter 130. An optical connector 146 terminates the pigtail cord 144. As can be seen in FIG. 5, the front wall 132 includes a slot 134 in which a strain relief boot 148 can fit. The strain relief boot 148 receives the pigtail cord 144 and provides strain relief thereto; the presence of the slot 134 can facilitate manufacturing and assembly of the filter 130, particularly with respect to the interconnection of the pigtail cord 144 with the electronics of the pass-through filter 130 discussed below.

The pass-through filter 130 includes optical filters that are used to separate the RFoG and PON downstream signals from each other and that combine the upstream RFoG and PON optical signals. For example, RFoG, 1 G PON and 10 G PON upstream and downstream signals are transmitted in the following wavelength ranges:

TABLE 1

| Type of Micronode | Downstream Wavelength (nm) | Allowable Downstream Variation (nm) | Upstream Wavelength (nm) | Allowable Upstream Variation (nm) |
| --- | --- | --- | --- | --- |
| RFoG | 1550 | 1540-1565 | 1610 | 1600-1620 |
| 1G PON | 1490 | 1485-1495 | 1310 | 1260-1360 |
| 10G PON | 1577 | 1575-1580 | 1270 | 1260-1280 |

More specifically, the pass-through filter 130 filters optical signals in the RFoG downstream and upstream bandwidths listed above from other optical signals, such as signals in the 1 G PON and 10 G PON downstream and upstream bandwidths. The optical signals in the RFoG downstream and upstream bandwidths ranges are transmitted to the pigtail cord 144, whereas the remaining optical signals are transmitted to the optical connector 142.

Figure 14:
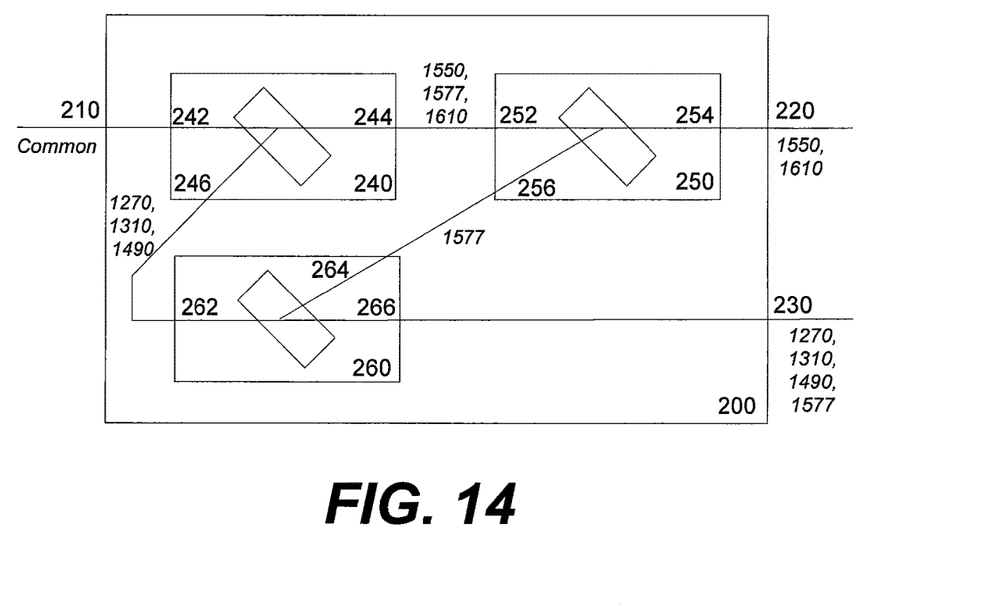
FIG. 14 is a schematic circuit diagram of a pass-through filter according to certain embodiments of the present invention.

FIG. 14 is a schematic diagram illustrating a pass-through filter 200 that may be used to implement the pass-through filter 130. As shown in FIG. 14, the pass-through filter 200 may include first through third optical connector ports 210, 220, 230 and first through third internal circuits 240, 250, 260. The first optical connector port 210 comprises a "common" optical connector port that receives the fiber optic drop cable 34. The second optical connector port 220 comprises an "RFoG" port that is used to connect the filter 200 to an RFoG micronode 110. In some embodiments, the second optical connector port 220 may be implemented using a pigtail connector 144, 146. The third optical connector port 230 comprises a pass-through connector port which may be connected to another optical device such as a second micronode 60 in the subscriber premise 40 via a fiber optic patch cord 54.

The first circuit 240 may comprise a wave division multiplexer that has a first port 242 that is connected to the first optical connector port 210, a second port 244 that is connected to the second circuit 250 and a third port 246 that is connected to the third circuit 260. The wave division multiplexer 240 passes optical signals having wavelengths above a first cut-off frequency between the first and second ports 242, 244 thereof, and reflects optical signals having wavelengths below the first cut-off frequency so that such signals pass between the first and third ports 242, 246 thereof. The first cut-off wavelength may be, for example, a wavelength of about 1520 nm. As such, all RFoG optical signals pass between the first circuit 240 and the second circuit 250, as do the 10 G PON downstream optical signals, while all 1 G PON optical signals pass between the first circuit 240 and the third circuit 260, as do the 10 G PON upstream optical signals.

The second circuit 250 may comprise a notch wave division multiplexer that has a first port 252 that is connected to the second port 244 of the first circuit 240, a second port 254 that is connected to the RFoG optical connector port 220 and a third port 256 that is connected to the third circuit 260. The notch wave division multiplexer 250 reflects optical signals having wavelengths in a mid-band range so that such signals pass between the first and third ports 252, 256 thereof. The notch wave division multiplexer 250 passes all other optical signals between the first and second ports 252, 254 thereof. The mid-band wavelength range that is reflected by the notch wave division multiplexer may be signals in, for example, about the 1575-1580 nm range that comprises the downstream 10 G PON optical bandwidth. Thus, the notch wave division multiplexer 250 routes all RFoG optical signals between the second port 254 thereof and the RFoG connector port 220, while the first and notch wave division multiplexers 240, 250 together route all 1 G and 10 G PON signals between the first common optical connector port 210 and the third circuit 260.

The third circuit 260 may comprise a wave division multiplexer that has a first port 262 that is connected to the third port 246 of the first circuit 240, a second port 264 that is connected to the third port 256 of the notch wave division multiplexer 250, and a third port 266 that is connected to the "pass" optical connector port 230. The wave division multiplexer 260 passes optical signals having wavelengths above a second cut-off frequency between the first and third ports 262, 266 thereof, and reflects optical signals having wavelengths above the second cut-off frequency so that they pass between the first and second ports 262, 264 thereof. The second cut-off frequency may be, for example, about 1540 nm (anywhere between 1500 and 1575 nm). Thus, the wave division multiplexer 260 acts to combine 1 G and 10 G PON optical signals so that they may pass between the first optical connector port 210 and the third optical connector port 230. In FIG. 14, identifiers in the form of nominal wavelengths are included that show how the wavelengths listed in TABLE 1 will pass-through the filter 200.

Figure 15:
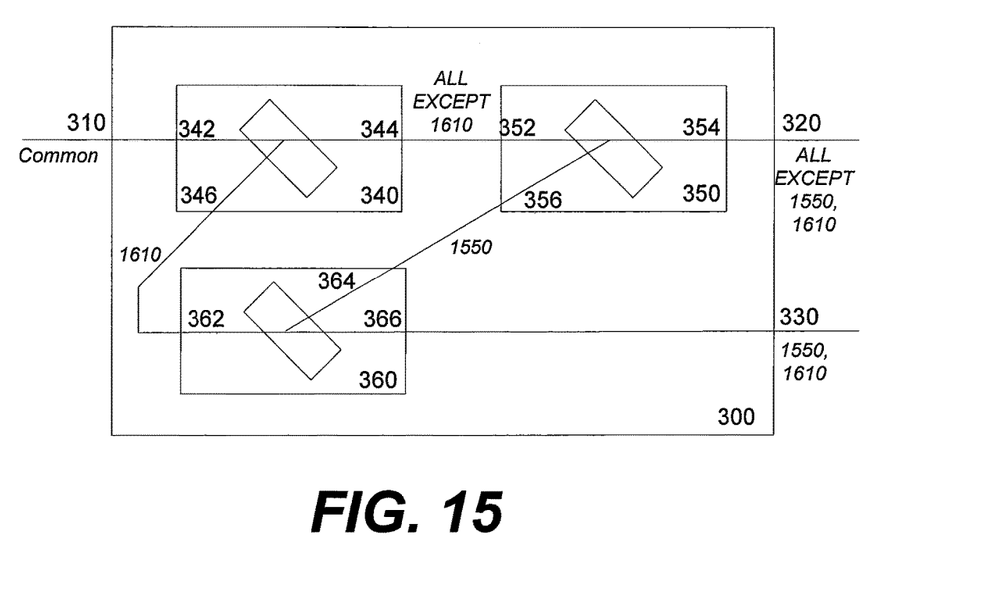
FIG. 15 is a schematic circuit diagram of an alternative pass-through filter according to certain embodiments of the present invention.

FIG. 15 is a schematic diagram illustrating an alternative pass-through filter 300 that may be used to implement the pass-through filter 130. As shown in FIG. 15, the pass-through filter 300 includes first through third optical connector ports 310, 320, 330 and first through third internal circuits 340, 350, 360. The first optical connector port 310 comprises a "common" optical connector port that receives the fiber optic drop cable 34. The second optical connector port 320 comprises a pass-through connector port which may be connected to another optical device such as a second micronode 60 in the subscriber premise 40 via a fiber optic patch cord 54. The third optical connector port 330 comprises an "RFoG" port that is used to connect the pass-through filter 300 to an RFoG micronode 110. In some embodiments, the third optical connector port 330 may be implemented using a pigtail connector 144, 146.

The first circuit 340 may comprise a first notch wave division multiplexer that has a first port 342 that is connected to the first optical connector port 310, a second port 344 that is connected to the second circuit 350 and a third port 346 that is connected to the third circuit 360. The first notch wave division multiplexer 340 reflects optical signals having wavelengths in a mid-band range so that such signals pass between the first and third ports 342, 346 thereof. The first notch wave division multiplexer 340 passes all other optical signals between the first and second ports 342, 344 thereof. The mid-band wavelength range that is reflected by the notch wave division multiplexer 340 may be signals in, for example, about the 1600-1620 nm range that comprise the upstream RFoG optical bandwidth.

The second circuit 350 may comprises a second notch wave division multiplexer that has a first port 352 that is connected to the second port 344 of the first circuit 340, a second port 354 that is connected to the pass-through optical connector port 330 and a third port 356 that is connected to the third circuit 360. The second notch wave division multiplexer 350 passes reflects optical signals having wavelengths in a mid-band range so that such signals pass between the first and third ports 352, 356 thereof. The second notch wave division multiplexer 350 passes all other optical signals between the first and second ports 352, 354 thereof. The mid-band wavelength range that is reflected by the notch wave division multiplexer 350 may be signals in, for example, about the 1540-1565 nm range that comprise the downstream RFoG optical bandwidth.

The third circuit 360 may comprise a wave division multiplexer that has a first port 362 that is connected to the third port 346 of the first notch wave division multiplexer 340, a second port 364 that is connected to the third port 356 of the second notch wave division multiplexer 350, and a third port 366 that is connected to the RFoG optical connector port 330. The wave division multiplexer 360 passes optical signals having wavelengths above a cut-off frequency between the first and third ports 362, 366 thereof, and reflects optical signals having wavelengths above the cut-off frequency so that such signals pass between the first and second ports 362, 364 thereof. The second cut-off frequency may be, for example, about 1580 nm (anywhere between 1565 and 1600 nm).

The pass-through filter 300 is more complex than the pass-through filter 200, as it includes two notch wave division multiplexers as opposed to just one notch wave division multiplexer. The pass-through filter 300, however, may support non-RFoG signals in addition to 1 G and 10 G PON signals such as, for example, coarse WDM pairs for Ethernet service or a 1625 nm optical time domain reflectometry signal.

Referring again to FIGS. 4-6, when used by itself, the micronode 110 is mounted in place on a wall, within an enclosure, or to another underlying structure via four screws that are inserted into the mounting bores 122. To create the assembly 100, the pass-through filter 130 can be mounted to underlie the micronode 110; i.e., the pass-through filter 130 is mounted between the micronode 110 and the underlying structure. The screws used to mount the micronode 110 may be replaced with longer screws which are inserted into the bores 122 of the micronode 110, through the bores 152 of the pass-through filter 130, and into the underlying structure to mount the assembly 100 thereto. As shown in FIG. 4, the connector 146 of the pigtail cord 144 is connected with the optical adapter 116 of the micronode 110. The optical connector 140 of the pass-through filter 130 can then receive the drop cable 34 that would typically be connected directly to the optical adapter 116 of the micronode 110. The pass-through filter 130 then separates the optical signals in the 155 nm and 1610 nm ranges from the remaining optical signals carried over the drop cable 34. The signals in the 1550 nm and 1610 nm ranges are transmitted via the pigtail cord 144 to the optical connector 116 of the micronode 110. Signals in the 1550 nm range are converted to RF signals within the micronode 110 and output as RF signals through the coaxial ports 114 to customer premise equipment devices 48. RF signals from the subscriber premise 40 enter the micronode 110 through the coaxial ports 114 and are converted to signals in the 1610 range, which are then passed to the fiber optic network infrastructure 30 by the pass-through filter 130. The remaining signals (i.e., those that are outside of the 1550 and 1610 nm ranges) are passed through the optical connector 142 to another optical device such as, for example, a PON micronode 60.

Use of the pass-through filter 130 can allow upgrading a subscriber premise to support additional bandwidth without the need to replace an already-installed micronode 110 in the subscriber premise 40 or the customer premise equipment 48 attached thereto. Such an upgrade may occur, for example, when a residence is to be supplied with additional services, such as high speed data services. The upgrade can be achieved by simply removing a mounted micronode 110, disconnecting the drop cable 34 from the optical connector 116 of the micronode 110, remounting the micronode 110 with the pass-through filter 130 underlying it, connecting the drop cable 34 to the optical connector 140, connecting the pigtail cord 144 to the optical connector 116 of the micronode 110, and connecting the optical connector 142 of the pass-through filter 130 to another optical device such as a PON micronode 60.

Figure 16:
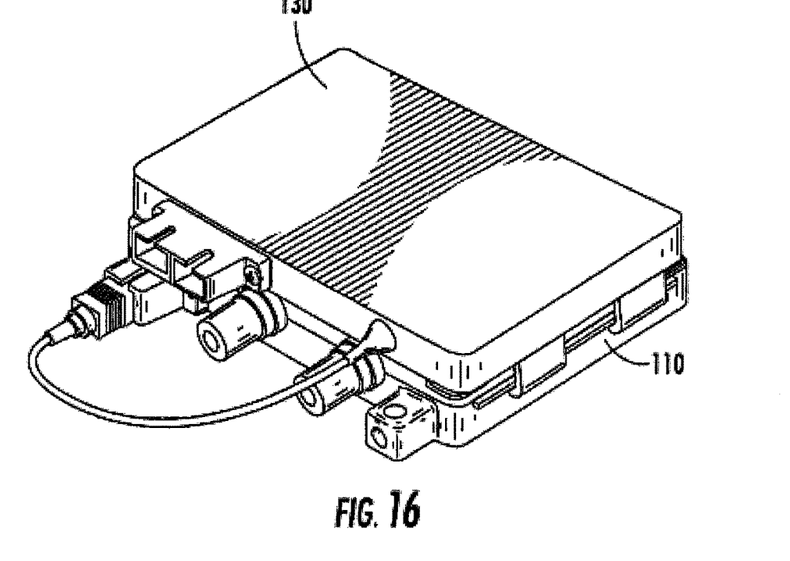
FIG. 16 is a perspective view of an assembly comprising a pass-through filter and a micronode according to further embodiments of the present invention.

It will be appreciated that many modifications may be made to the above described assemblies without departing from the scope of the invention. For example, FIG. 16 illustrates an assembly 400 that includes a micronode 110' and an external pass-through filter 130' that are mounted to each other using snap-clips. The micronode 110' may, for example, be identical to the micronode 110' that is described above, except that the micronode 110' may have a planar top surface and may have an outwardly projecting ledge extending from the top of each sidewall of the housing. The external pass-through filter 130' may be identical to the pass-through filter 130' that is described above, except that the mounting bores 152 through the filter housing may be omitted and replaced with snap clips that extend downwardly from side surfaces of the housing. The pass-through filter 130' may be mounted on the micronode 110' simply by positioning the pass-through filter 130' over the micronode 110' and forcing the distal ends of the snap clips downwardly so that they pass over the respective ledges. The snap-clips may include respective notches that are configured to receive sidewalls of the respective ledges. In this fashion, an installer may very quickly and easily mount the external pass-through filter 130' on the micronode 110' without having to remove the micronode 110'.

Figure 17:
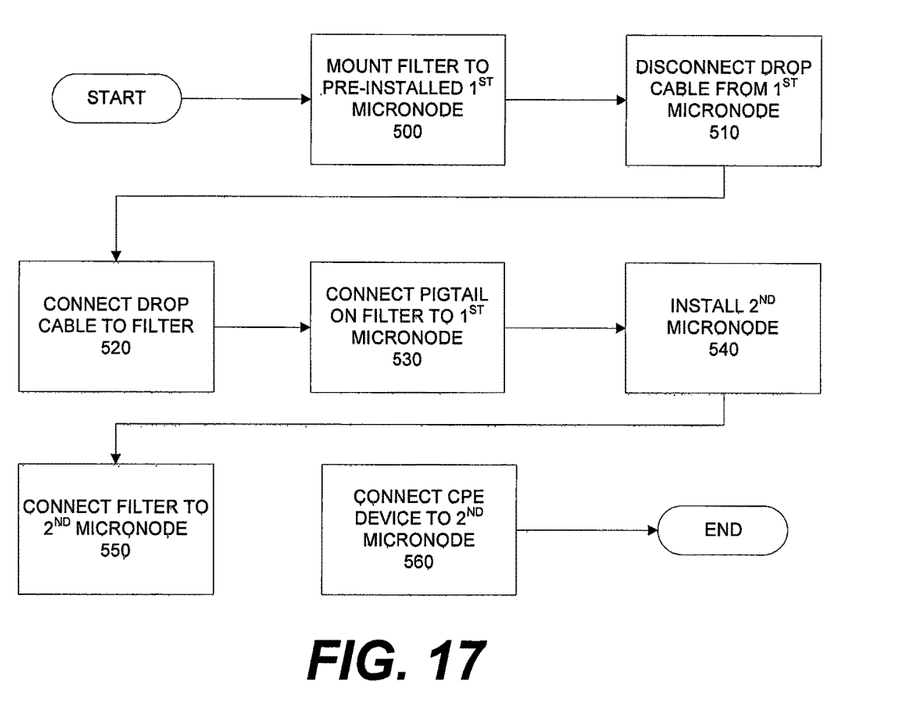
FIG. 17 is a flow chart of a method of deploying additional services to a subscriber premise in an FTTH network according to certain embodiments of the present invention.

FIG. 17 is a flow chart illustrating a method of deploying additional services to a subscriber premise of an FTTH network according to certain embodiments of the present invention. As shown in FIG. 17, operations may begin with an installer mounting an external pass-through filter to a first micronode that was pre-installed at the subscriber premise (block 500). The installer may also disconnect a fiber optic drop cable from a connector port on the first micronode (block 510) and then connect the fiber optic drop cable to a common port on the external pass-through filter (block 520). The installer also connects a pigtail of the external pass-through filter to the connector port of the first micronode that had previously received the fiber optic drop cable (block 530). The installer may also install a second micronode at the subscriber premise (block 540), and connect a connector port of the second micronode to a pass-through connector port of the external pass-through filter using a fiber optic patch cord (block 550). The installer may also connect a customer premise equipment device to a coaxial connector port of the second micronode (block 560). In this fashion, the installer may upgrade a subscriber premise that is receiving subscription services through a first micronode to receive additional subscription services through the second micronode without terminating the services received through the first micronode. It will be appreciated that the steps of the method set forth above may be carried out in a variety of different orders.

In embodiments where the micronode 110 and pass-through filter 130 of FIGS. 4-13 are used, the step of mounting the external pass-through filter to the first micronode may involve (1) removing a first plurality of screws that pass-through mounting bores in a housing of the first micronode to detach the first micronode from a mounting surface, (2) aligning the first micronode and the pass-through filter so that the mounting bores in the housing of the first micronode are aligned with mounting bores in a housing of the pass-through filter, each pair of aligned mounting bores comprising a mounting channel and (3) inserting a second plurality of screws through the respective mounting channels to mount the first micronode and the external pass-through filter to the mounting surface in back-to-back arrangement. In contrast, in embodiments where the micronode 110' and pass-through filter 130' of FIG. 16 are used, the step of mounting the external pass-through filter to the first micronode may simply involve attaching the external pass-through filter to the first micronode by connecting the external pass-through filter to the first micronode using snap-clips. It should be noted that in other embodiments the snap clips may be provided on the micronode and the ledge or other engaging surfaces may be provided on the pass-through filter.

The present invention has been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements and/or components, but do not preclude the presence or addition of one or more other features, operations, elements, components and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. An assembly, comprising:
    a micronode having a micronode housing, the micronode housing including a plurality of mounting bores, the micronode also including an optical connector and a coaxial connector port; and
    a filter having a filter housing, the filter housing underlying the micronode housing, the filter housing including a plurality of mounting bores, the mounting bores of the filter housing aligning with the mounting bores of the micronode housing, the filter including a first optical connector configured to receive an optical drop cable, a second optical connector configured to receive an optical cable, and an optical pigtail cord that is configured to connect to the optical connector of the micronode, wherein the filter includes a first low pass wave division multiplexer, a second low pass wave division multiplexer and a notch wave division multiplexer.

2. The assembly of claim 1, wherein the filter further includes circuits that route optical signals in the ranges of about 1550 nm and about 1610 nm to the optical pigtail cord and that route optical signals in other wavelength ranges to the second optical connector.

3. The assembly of claim 1, wherein the notch wave division multiplexer passes signals in the 1540-1565 nm and 1600-1620 nm wavelength ranges between the first low pass wave division multiplexer and the optical pigtail cord, and passes signals in the 1575-1580 nm wavelength range between the first low pass wave division multiplexer and the second low pass wave division multiplexer.

4. The assembly of claim 3, wherein the first low pass wave division multiplexer passes signals at wavelengths below about 1500 nm between the optical drop cable and the second low pass wave division multiplexer, and passes signals at wavelengths above about 1540 nm between the optical drop cable and the notch wave division multiplexer.

5. An assembly, comprising:
a micronode having a micronode housing, the micronode housing including a plurality of mounting bores, the micronode also including an optical connector and a coaxial connector port; and
a filter having a filter housing, the filter housing underlying the micronode housing, the filter housing including a plurality of mounting bores, the mounting bores of the filter housing aligning with the mounting bores of the micronode housing, the filter including a first optical connector configured to receive an optical drop cable, a second optical connector configured to receive an optical cable, and an optical pigtail cord that is configured to connect to the optical connector of the micronode, wherein the filter includes a low pass wave division multiplexer, a first notch wave division multiplexer and a second notch wave division multiplexer.

6. The assembly of claim 5, wherein the first notch wave division multiplexer passes signals in about the 1600-1620 nm wavelength range between the optical drop cable and the low pass wave division multiplexer, and passes optical signals in wavelength ranges below about 1580 nm and above about 1625 nm between the optical drop cable and the second notch wave division multiplexer.

7. The assembly of claim 6, wherein the second notch wave division multiplexer passes signals in about the 1540-1565 nm wavelength range between the first notch wave division multiplexer and the low pass wave division multiplexer, and passes optical signals below about 1495 nm and above about 1600 nm between the first notch wave divisionmultiplexer and the second optical connector.

8. The assembly of claim 7, wherein the low pass wave division multiplexer passes signals in the RFoG upstream and downstream wavelength bands between the first and/or second notch wave division multiplexers and the optical pigtail cord.

9. The assembly of claim 1, wherein the filter housing has substantially the same footprint as the micronode housing.

10. An assembly, comprising:
a micronode having an optical connector port and at least one radio frequency connector port;
a filter that is configured to be mounted on the micronode, the filter having a first optical connector port that is configured to be connected to a drop cable of a cable television network, a second optical connector port that is configured to be connected to the micronode, and a third optical connector port that is configured to be connected to an external device, wherein the filter includes a first low pass wave division multiplexer, a second low pass wave division multiplexer and a notch wave division multiplexer.

11. The assembly of claim 10, wherein the filter is configured to be detachably mounted on the micronode via at least one snap clip.

12. The assembly of claim 10, wherein the filter has substantially the same footprint as the micronode.

13. The assembly of claim 10, wherein the micronode has a housing that includes a first plurality of mounting bores and the filter has a housing that has a second plurality of mounting bores that align with the first plurality of mounting bores when the filter is positioned on the micronode.

14. The assembly of claim 10, wherein the notch wave division multiplexer passes signals in the 1540-1565 nm and 1600-1620 nm wavelength ranges between the first low pass wave division multiplexer and the micronode, and passes signals in the 1575-1580 nm wavelength range between the first low pass wave division multiplexer and the second low pass wave division multiplexer.

15. The assembly of claim 14, wherein the first low pass wave division multiplexer passes signals at wavelengths below about 1500 nm between the drop cable and the second low pass wave division multiplexer, and passes signals at wavelengths above about 1540 nm between the drop cable and the notch wave division multiplexer.

16. An assembly, comprising:
a micronode having an optical connector port and at least one radio frequency connector port;
a filter that is configured to be mounted on the micronode, the filter having a first optical connector port that is configured to be connected to a drop cable of a cable television network, a second optical connector port that is configured to be connected to the micronode, and a third optical connector port that is configured to be connected to an external device, wherein the filter includes a low pass wave division multiplexer, a first notch wave division multiplexer and a second notch wave division multiplexer.

17. The assembly of claim 16, wherein the first notch wave division multiplexer passes signals in about the 1600-1620 nm wavelength range between the drop cable and the low pass wave division multiplexer, and passes optical signals in wavelength ranges below about 1580 nm and above about 1625 nm between the drop cable and the second notch wave division multiplexer.

18. The assembly of claim 17, wherein the second notch wave division multiplexer passes signals in about the 1540-1565 nm wavelength range between the first notch wave division multiplexer and the low pass wave division multiplexer, and passes optical signals below about 1495 nm and above about 1600 nm between the first notch wave division multiplexer and the external device.

* * * * *

UNITED STATES PATENT AND TRADEMARK OFFICE
CERTIFICATE OF CORRECTION

PATENT NO. : 10,028,039 B2
APPLICATION NO. : 14/940217
DATED : July 17, 2018
INVENTOR(S) : Mark O. Vogel

Page 1 of 1

It is certified that error appears in the above-identified patent and that said Letters Patent is hereby corrected as shown below:

In the Claims

In Column 15, Line 46-47, Claim 7, delete "divisionmultiplexer" and insert
-- division multiplexer --, therefor.

Signed and Sealed this
Thirtieth Day of October, 2018

Andrei Iancu
*Director of the United States Patent and Trademark Office*